(12) United States Patent
Kmoch et al.

(10) Patent No.: US 7,798,804 B2
(45) Date of Patent: Sep. 21, 2010

(54) SPLIT MOLD INSERT FOR A MOLDING SYSTEM

(75) Inventors: Sven Kmoch, Platten (DE); Ralf Walter Fisch, Saarburg (DE); Arnold Mai, Irrel (DE); Friedhelm Schmitz, Wittlich (DE)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 615 days.

(21) Appl. No.: 11/740,564

(22) Filed: Apr. 26, 2007

(65) Prior Publication Data
US 2008/0268086 A1 Oct. 30, 2008

(51) Int. Cl.
*B29C 45/17* (2006.01)
*B29C 45/44* (2006.01)

(52) U.S. Cl. .............. 425/441; 425/190; 425/525; 425/537; 425/DIG. 5; 425/DIG. 58

(58) Field of Classification Search .......... 425/441, 425/525, DIG. 5, DIG. 38, DIG. 58, 190, 425/537, 556
See application file for complete search history.

(56) References Cited

U.S. PATENT DOCUMENTS

| | | | |
|---|---|---|---|
| 4,889,480 A | * | 12/1989 | Nakamura et al. .......... 425/577 |
| 5,037,290 A | * | 8/1991 | Curliss et al. .............. 425/556 |
| 5,736,173 A | | 4/1998 | Wright et al. |
| 6,101,791 A | | 8/2000 | Louviere |

(Continued)

FOREIGN PATENT DOCUMENTS

CA  2348830 A1  9/2002

(Continued)

OTHER PUBLICATIONS

Snapshot, DSCN2866 JPG., taken on May 9, 2005 at 9:34.

(Continued)

*Primary Examiner*—Yogendra N Gupta
*Assistant Examiner*—Emmanuel S Luk
(74) *Attorney, Agent, or Firm*—Husky Intellectual Property Services

(57) ABSTRACT

According to embodiments of the present invention, there is provided a split mold insert for a molding system. A first split mold insert complementary to a second split mold insert, the first and second split mold inserts configured, in use, to form a neck region of a preform capable of being blow-molded. The first split mold insert comprises a top portion and a bottom portion; the top portion for abutting, in use, a cavity plate assembly and the bottom portion being at an opposite extreme relative to the top portion; a back portion and a face portion opposite each other, extending between the top and bottom portions, the face portion defining a molding surface defining portion for forming, in use, at least a portion of the neck region of the preform; the back portion comprising a connecting interface for connecting, in use, to a slide bar.

53 Claims, 11 Drawing Sheets

U.S. PATENT DOCUMENTS

| | | | |
|---|---|---|---|
| 6,416,312 B1 * | 7/2002 | Gonser et al. | 425/525 |
| 6,450,797 B1 * | 9/2002 | Joseph | 425/556 |
| 6,488,881 B2 * | 12/2002 | Gellert | 264/328.16 |
| 6,569,370 B1 * | 5/2003 | Amin et al. | 264/219 |
| 6,799,962 B2 | 10/2004 | Mai et al. | |
| 6,966,764 B2 * | 11/2005 | Wohlgemuth | 425/168 |
| 6,989,124 B2 * | 1/2006 | Miller et al. | 264/318 |
| 2002/0127298 A1 * | 9/2002 | Harrison et al. | 425/DIG. 5 |
| 2007/0059395 A1 | 3/2007 | Serniuck et al. | |

FOREIGN PATENT DOCUMENTS

| | | | |
|---|---|---|---|
| CA | 2547763 A1 | 6/2005 | |
| EP | 0805012 A1 | 5/1997 | |
| JP | 2002160590 A | 4/2002 | |

OTHER PUBLICATIONS

Snapshot, DSCN2856 JPG., taken on May 9, 2005 at 9:34.
Snapshot, DSCN3011 (2) JPG., taken on Jun. 9, 2005 at 8:57.
Snapshot, DSCN3012 (2) JPG., taken on Jun. 9, 2005 at 8:58.
Snapshot, DSCN3128 (2) JPG., taken on Jun. 9, 2005 at 11:33.
Snapshot, DSCN3140 (2) JPG., taken on Jun. 9, 2005 at 12:09.
Tetrapak, as per Derek McCready, 8 molds were built in approximately 1993.
Neck Ring Retention, as per Derek McCready, 5 molds of this design were sold in circa. 1998-2000.

* cited by examiner

SPLIT MOLD INSERT FOR A MOLDING SYSTEM

FIELD OF THE INVENTION

The present invention generally relates to, but is not limited to, molding systems, and more specifically the present invention relates to, but is not limited to, a split mold insert for use in a molding system.

BACKGROUND OF THE INVENTION

Molding is a process by virtue of which a molded article can be formed from molding material by using a molding system. Various molded articles can be formed by using the molding process, such as an injection molding process. One example of a molded article that can be formed, for example, from polyethylene terephalate (PET) material is a preform that is capable of being subsequently blown into a beverage container, such as, a bottle and the like.

As an illustration, injection molding of PET material involves heating the PET material (ex. PET pellets, PEN powder, PLA, etc.) to a homogeneous molten state and injecting, under pressure, the so-melted PET material is injected into a molding cavity defined, at least in part, by a female cavity piece and a male core piece mounted respectively on a cavity plate and a core plate of the mold. The cavity plate and the core plate are urged together and are held together by clamp force, the clamp force being sufficient enough to keep the cavity and the core pieces together against the pressure of the injected PET material. The molding cavity has a shape that substantially corresponds to a final cold-state shape of the molded article to be molded. The so-injected PET material is then cooled to a temperature sufficient to enable ejection of the so-formed molded article from the mold. When cooled, the molded article shrinks inside of the molding cavity and, as such, when the cavity and core plates are urged apart, the molded article tends to remain associated with the core piece. Accordingly, by urging the core plate away from the cavity plate, the molded article can be demolded, i.e. ejected off of the core piece. Ejection structures are known to assist in removing the molded articles from the core halves. Examples of the ejection structures include stripper plates, stripper rings and neck rings, ejector pins, etc.

When dealing with molding a preform that is capable of being blown into a beverage container, one consideration that needs to be addressed is forming a so-called "neck region". Typically and as an example, the neck region includes (i) threads (or other suitable structure) for accepting and retaining a closure assembly (ex. a bottle cap), and (ii) an anti-pilferage assembly to cooperate, for example, with the closure assembly to indicate whether the end product (i.e. the beverage container that has been filled with a beverage and shipped to a store) has been tampered with in any way. The neck region may comprise other additional elements used for various purposes, for example, to cooperate with parts of the molding system (ex. a support ledge, etc.). As is appreciated in the art, the neck region can not be easily formed by using the cavity and core halves. Traditionally, split mold inserts (sometimes referred to by those skilled in the art as "neck rings") have been used to form the neck region.

With reference to FIG. 1, a section along a portion of an injection mold 50 illustrates a typical molding insert stack assembly 60 that is arranged within a molding system (not depicted). The description of FIG. 1 that will be presented herein below will be greatly simplified, as it is expected that one skilled in the art will appreciate configuration of other components of the injection mold 50 that will not be discussed in the following description.

The molding insert stack assembly 60 includes a neck ring insert pair 52 that together with a mold cavity insert 54, a gate insert (not shown) and a core insert 61 define a molding cavity 61 where molding material can be injected to form a molded article. In order to facilitate forming of the neck region of the molded article and subsequent removal of the molded article, the neck ring insert pair 52 comprises a pair of complementary neck ring inserts that are mounted on adjacent slides of a slide pair 68. The slide pair 68 is slidably mounted on a top surface of a stripper plate 66. As commonly known, and as, for example, generally described in U.S. Pat. No. 6,799,962 to Mai et al (granted on Oct. 5, 2004), the stripper plate 66 is configured to be movable relative to a cavity plate assembly 74 and a core plate assembly (not depicted), when the mold in arranged in an open configuration, whereby the slide pair 68, and the complementary neck ring inserts mounted thereon, can be laterally driven, via a cam arrangement (not shown), for the release of the molded article from the molding cavity 61.

A typical neck ring insert has a body that includes a pair of projecting portions 70 that extend from a top and a bottom face of a flange portion 72 (i.e. a top projecting portion and a bottom projecting portion). Typically, the bottom face of the flange portion 72 abuts, in use, a top surface of the slide pair 68. Even though not depicted in FIG. 1, one skilled in the art will appreciate that the neck ring insert pair 52 comprises suitable fasteners for connecting to a respective one of the slide pair 68. In use, during certain portions of a molding cycle, the top projecting portion cooperates with a female receptacle disposed on the cavity plate assembly 74.

It is worthwhile noting that the top projecting portion traditionally performs two functions, which can be broadly categorized as an alignment function and a locking function. Generally speaking, the alignment function involves assisting, at least partially, in aligning the neck ring vis a vis the cavity plate 74. The locking function involves assisting, at least partially, in locking the neck rings in a locked position, for example, during an injection portion and in-mold cooling portion of a molding cycle, etc. It is known in the art to arrange the top projecting portion of the neck ring and the corresponding female receptacle of the cavity plate 74 in a pre-loaded arrangement. This pre-loading of the top projecting portion of the neck ring and the corresponding female receptacle can lead to premature fatigue and contributes to increased costs of operating the molding system due to a need to replace neck rings more often.

As is depicted in FIG. 1, the molding insert stack assembly 60 can be said to be associated with a stack height generally depicted in FIG. 1 at H1. As can be further seen in FIG. 1, a portion of the stack height H1 is contributed to by a height of the neck ring insert pair 52, depicted in FIG. 1 at H2. Put another way, it can be said that the height H2 of the neck ring insert pair contributes to an increased stack height H1. The increased stack height H1 results in several disadvantages associated with the molding insert stack assembly 60. Firstly, due to the increased stack height H1, there is a need to increase a length of the core insert 61. The increased length of the core insert 61 can lead to several problems, including increased potential for so-called "core shift" of the core insert 61. Secondly, the increased stack height H1 requires a molding system (not depicted) having a larger footprint.

SUMMARY OF THE INVENTION

According to a first broad aspect of the present invention, there is provided a first split mold insert complementary to a second split mold insert, the first and second split mold inserts configured, in use, to form a neck region of a preform capable of being blow-molded. The first split mold insert comprises a top portion and a bottom portion; the top portion for abutting, in use, a cavity plate assembly and the bottom portion being at an opposite extreme relative to the top portion; a back portion and a face portion opposite each other, extending between the top and bottom portions, the face portion defining a molding surface defining portion for forming, in use, at least a portion of the neck region of the preform; the back portion comprising a connecting interface for connecting, in use, to a slide bar.

According to a second broad aspect of the present invention, there is provided a split mold assembly for use with an injection molding system for producing a preform capable of being blow-molded into a container. The split mold assembly comprises a slide bar for attachment, in use, to an actuating bar of the injection molding system, the slide bar defining a face slide portion; a split mold insert comprising: a top portion and a bottom portion; the top portion for abutting, in use, a cavity plate assembly and the bottom portion being at an opposite extreme relative to the top portion; a back portion and a face portion opposite each other, extending between the top and bottom portions, the face portion defining a molding surface defining portion for forming, in use, at least a portion of the neck portion of the preform; the back portion comprising a connecting interface for connecting, in use, to the face slide portion of the slide bar.

According to a third broad aspect of the present invention, there is provided an injection molding system incorporating the split mold assembly.

According to a fourth broad aspect of the present invention, there is provided a connecting interface positioned between (i) a back portion of a split mold insert, the back portion being at an opposite extreme relative to a face portion of the split mold insert, the face portion defining a molding surface defining portion for forming, at least in part, a neck region of a preform capable of being blow-molded into a container and (ii) a face slide portion of a slide bar; the connecting interface comprising:

According to another broad aspect of the present invention, there is provided a split mold assembly for use with an injection molding system for producing a preform capable of being blow-molded into a container, the split mold assembly comprising a slide bar for attachment, in use, to an actuating bar of the injection molding system; a split mold insert comprising a connecting interface disposed on a back portion thereof for connection, in use, to the slide bar.

According to yet another broad aspect of the present invention, there is provided a mold insert configured, in use, to form a portion of an injection molded article. The mold insert comprises a top portion and a bottom portion; said top portion for abutting, in use, a cavity plate and said bottom portion being at an opposite extreme relative to said top portion; a back portion and a face portion opposite each other, extending between said top and bottom portions, said face portion defining a molding surface defining portion for forming, in use, at least a portion of the molded article; the back portion comprising a connecting interface for connecting, in use, to a slide bar.

A technical effect, amongst others, of the aspects of the present invention may include reduced molding insert stack height. Another technical effect of some of the aspects of the present invention, is a shorter core assembly required, resulting in savings in material required to produce the core assembly. Yet another technical effect of some aspects of the present invention is a potential reduction in wear of various components of the molding insert stack due to improved force distribution. Yet another technical effect of some aspects of the present invention is more efficient cooling due to a particular arrangement of the split mold inserts and the associated slides. It should be expressly understood that not all of the technical effects, in their entirety, need be realized in each and every embodiments of the present invention.

DESCRIPTION OF THE DRAWINGS

A better understanding of the embodiments of the present invention (including alternatives and/or variations thereof) may be obtained with reference to the detailed description of the exemplary embodiments along with the following drawings, in which.

DETAILED DESCRIPTION OF EMBODIMENTS

Figure 2:
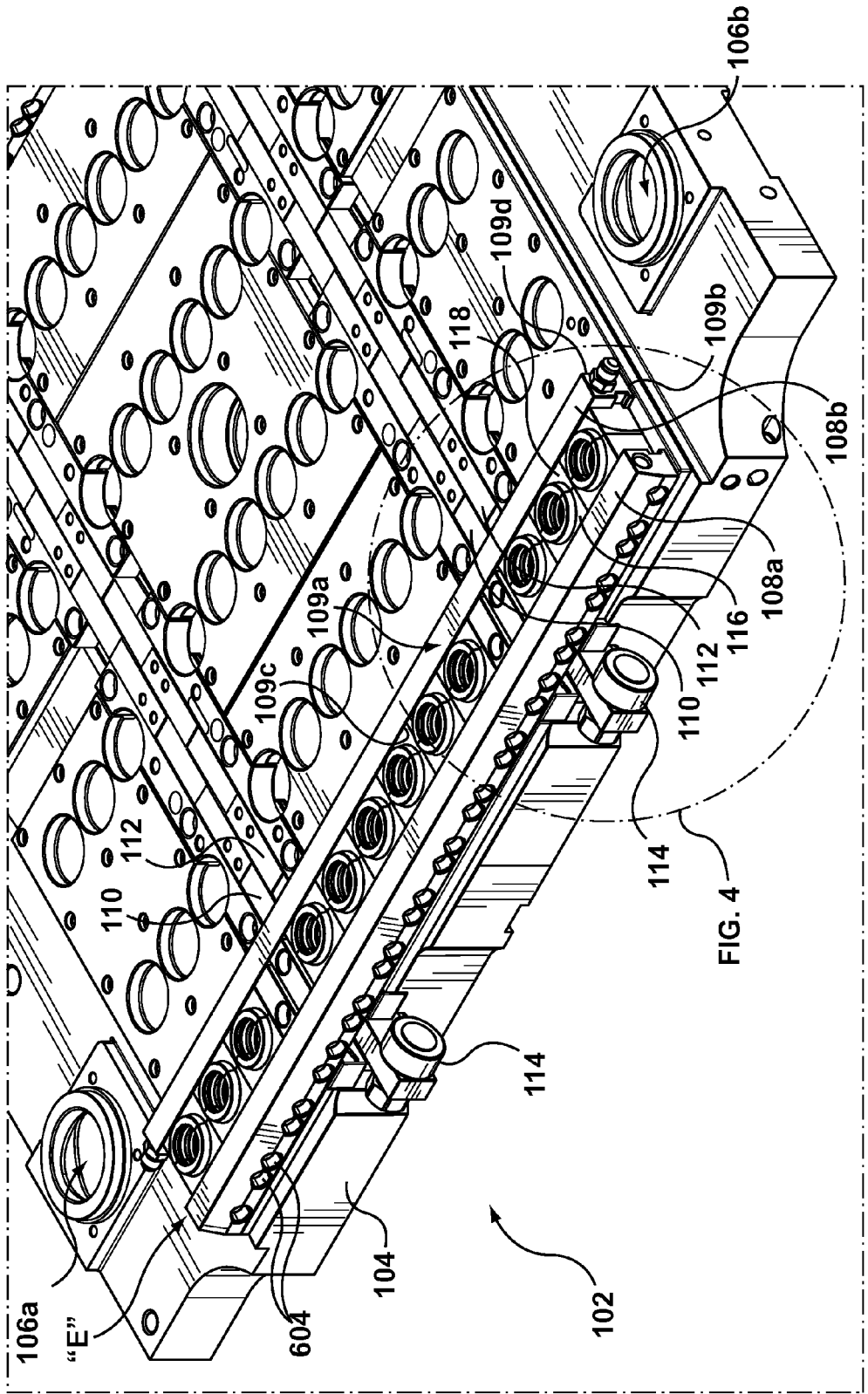
FIG. 2 is a perspective view of a stripper assembly 102 according to a non-limiting embodiment of the present invention.
Figure 3:
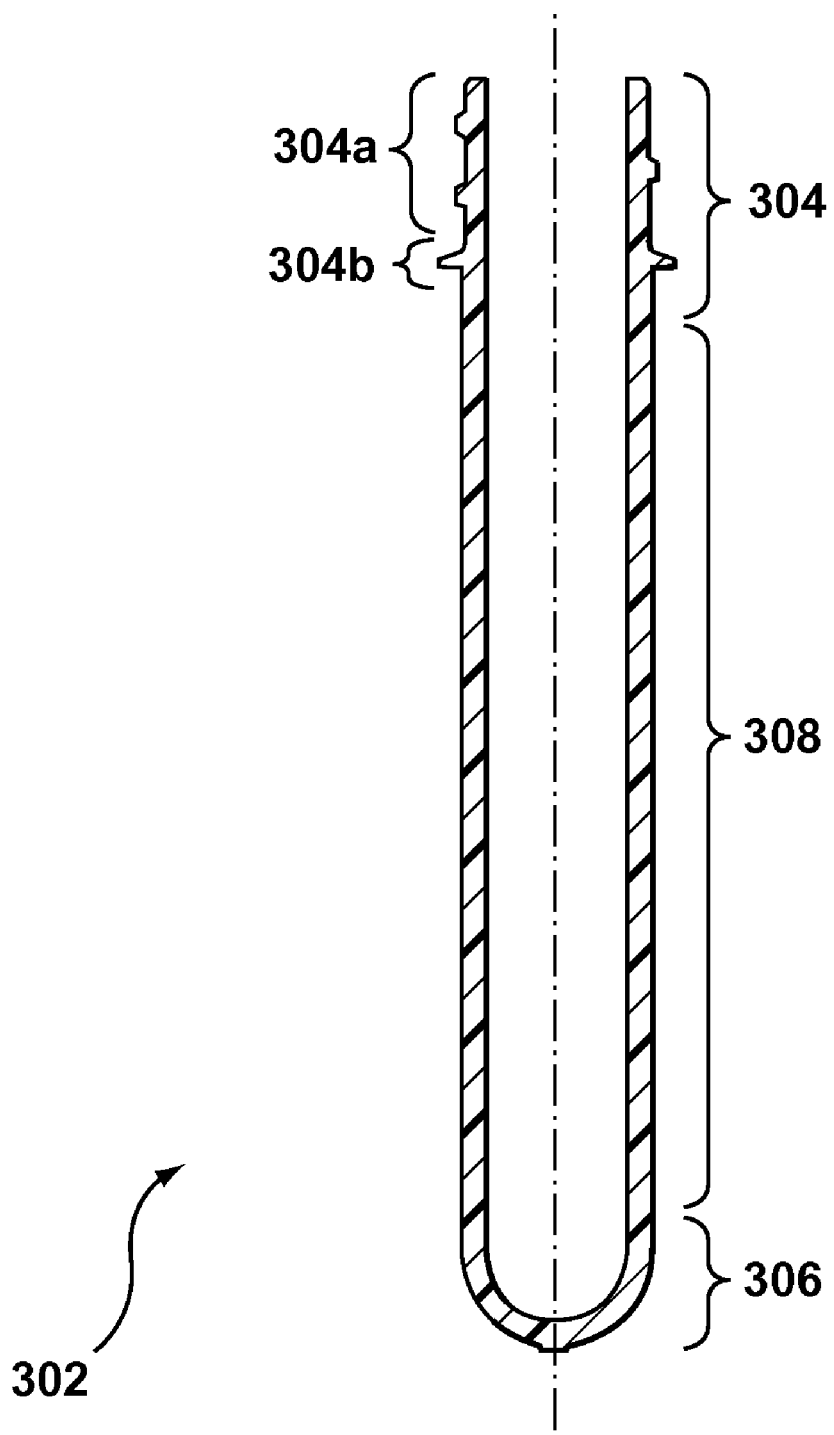
FIG. 3 is a schematic view of a preform 302 that can be produced using an injection molding system that includes the stripper assembly 102 of FIG. 2, according to a non-limiting embodiment of the present invention.

With reference to FIG. 2, a stripper assembly 102 according to a non-limiting embodiment of the present invention is depicted. The stripper assembly 102 is capable of being configured to implement a split mold insert according to various embodiments of the present invention. The stripper assembly 102 can be used within an injection molding system (not depicted), which can be, for example, an injection molding system for producing a preform, capable of being subsequently blow-molded into a container, such as a beverage container and the like. An example of such a preform is shown in FIG. 3, which depicts a non-limiting embodiment of a preform 302. The preform 302 generally comprises three regions—a neck region 304, an end region 306 disposed at an opposite extreme of the preform 302 and a body region 308 extending between the end region 306 and the neck region 304. The neck region 304 includes, without limitation and as an example only, a thread portion 304a and a support ledge portion 304b. The preform 302 is capable of being blow-molded into a container, such as a beverage container and the like. It should be expressly understood that the preform 302 can have any other known configuration, such as, for example, a bell-shaped configuration and the like. Persons skilled in the art will readily appreciate the invention is applicable to other injected molded articles.

Returning to the description of FIG. 2, the stripper assembly 102 comprises a base 104. Generally speaking, the purposes of the base 104 is to be mounted, in use, onto a component of the molding system (not depicted), such as, for example, onto a mold half (not depicted) for movement, in use, at least partially therewith along an operational axis of the molding system (not depicted). To that extent, the base 104 can comprise a plurality of mounting structures, only two of which, a first mounting structure 106a and a second mounting structure 106b are depicted in FIG. 2. It should be appreciated that the stripper assembly 102 can be configured for at least partially independent movement along the operational axis of the molding system (not depicted) relative to the mold half (not depicted). Such independent movement is known in the art and can be actuated by any suitable means, such as, for example, a hydraulic actuator and the like.

The stripper assembly 102 further comprises a first slide bar 108a and a second slide bar 108b, jointly referred to herein below as a pair of slide bars 108. It should be noted that the stripper assembly 102 can comprise a plurality of pairs of slide bars 108, however only a single instance of the pair of slide bars 108 has been depicted in FIG. 2 for the sake of simplicity. The stripper assembly 102 further comprises a plurality of first actuating bars 110 and a plurality of second actuating bars 112. The plurality of the first actuating bars 110 is coupled to the first slide bar 108a (as well as other first slide bars 108a potentially present within the stripper assembly 102, but omitted from FIG. 2 for the sake of simplicity) for effecting lateral movement of the first slide bar 108a to and away relative to the second slide bar 108b. The plurality of the second actuating bars 112 is coupled to the second slide bar 108b (as well as other second slide bars 108b potentially present within the stripper assembly 102, but omitted from FIG. 2 for the sake of simplicity) for effecting lateral movement of the second slide bar 108b to and away relative to the first slide bar 108a.

To this extent, the plurality of first actuating bars 110 is coupled to a first pair of sliding actuators 114. In the specific non-limiting embodiment of the present invention depicted in FIG. 2, the first pair of sliding actuators 114 comprises a respective cam follower that cooperates with a respective cam (not depicted) to effect lateral movement of the plurality of first actuating bars 110. However, it should be understood that in alternative non-limiting embodiments of the present invention, the first pair of sliding actuators 114 can have other configurations and can be embodied, for example, in a servo motor or another type of an actuator. Similarly, the plurality of second actuating bars 112 can be coupled to a second pair of sliding actuators (not depicted), which can be substantially similar to the first pair of sliding actuators 114.

Continuing with description of FIG. 2, the stripper assembly 102 further comprises a plurality of first split mold inserts 116 coupled to the first slide bar 108a for movement therewith and a plurality of second split mold inserts 118 coupled to the second slide bar 108b for movement there with. As will be appreciated, the movement of the plurality of first split mold inserts 116 and the plurality of second split mold inserts 118 towards each other into a closed position (as is depicted in FIG. 2) and away from each other into an open position (not depicted) allows for (i) first forming and (ii) subsequent removing of molded articles, such as the preform 302. More specifically, when the plurality of first split mold inserts 116 and the plurality of second split mold inserts 118 are urged together and held in the closed position, they cooperate to define at least in part a respective neck region 304 of a respective preform 302. When the plurality of first split mold inserts 116 and the plurality of second split mold inserts 118 are urged apart into the open position, the plurality of first split mold inserts 116 and the plurality of second split mold inserts 118 clear the neck region 304, including the thread portion 304a and the support ledge portion 304b thereof, effectively allowing for the preform 302 to be removed. How the preform 302 is removed is known in the art and, as such, need not be discussed here at any length.

Using the second slide bar 108b as an example, the second slide bar 108b comprises a slide base 109a. The slide base 109a comprises a first slide portion 109b for connecting, in use, to the plurality of second actuating bars 112. Configuration of the first slide portion 109b is known to those of skill in the art and, as such, need not be discussed here at any length. Suffice it to say, that the first slide portion 109b can be associated with any suitable fastener, such as, a bolt and the like. The slide base 109a comprises a second slide portion 109c for connecting, in use and as will be described in greater detail herein below, the slide base 109a to the plurality of second split mold inserts 118. The second slide portion 109c can also be thought as a face slide portion of the second slide bar 108b. The slide base 109a further comprises a third slide portion 109d, the third slide portion 109d disposed at an opposite extreme vis a vis the second slide portion 109c. Accordingly, the third slide portion 109d can also be thought as a back slide portion of the second slide bar 108b. Function associated with the third slide portion 109d will be described in greater detail herein below.

With continued reference to FIG. 2 and with further reference to FIG. 4, a given one of the plurality of second split mold inserts 118 will now be described. For the sake of clarity, the given one of the plurality of second split mold inserts 118 will be referred to as a "split mold insert 118a". It should be noted that others of the plurality of second split mold inserts 118 can be substantially similar to the split mold insert 118a. Similarly, each of the plurality of first split mold inserts 116 can be substantially similar to the split mold insert 118a.

The split mold insert 118a comprises a top portion 402 and a bottom portion 404, opposite the top portion 402. The split mold insert 118a further comprises a face portion 406 and a back portion 408. The face portion 406 and the back portion 408 are disposed opposite each other and depend from the top portion 402 towards the bottom portion 404. The face portion 406 comprises a molding surface defining portion 410, which defines, in part, a portion of an external surface of the preform 302. More specifically, the molding surface defining portion 410 defines, in part, a portion of the neck region 304. Even more specifically, the molding surface defining portion 410 defines, in part, a portion of the thread portion 304a and the support ledge portion 304b. The split mold insert 118a further comprises a taper portion 412, which generally protrudes above the top portion 402. Generally speaking and as is known, the taper portion 412 cooperates with other elements of the molding system (not depicted), such as, for example, a taper portion of a cavity mold insert (not depicted), for example, to position the split mold insert 118a within the mold cavity insert (not depicted).

Figure 4:
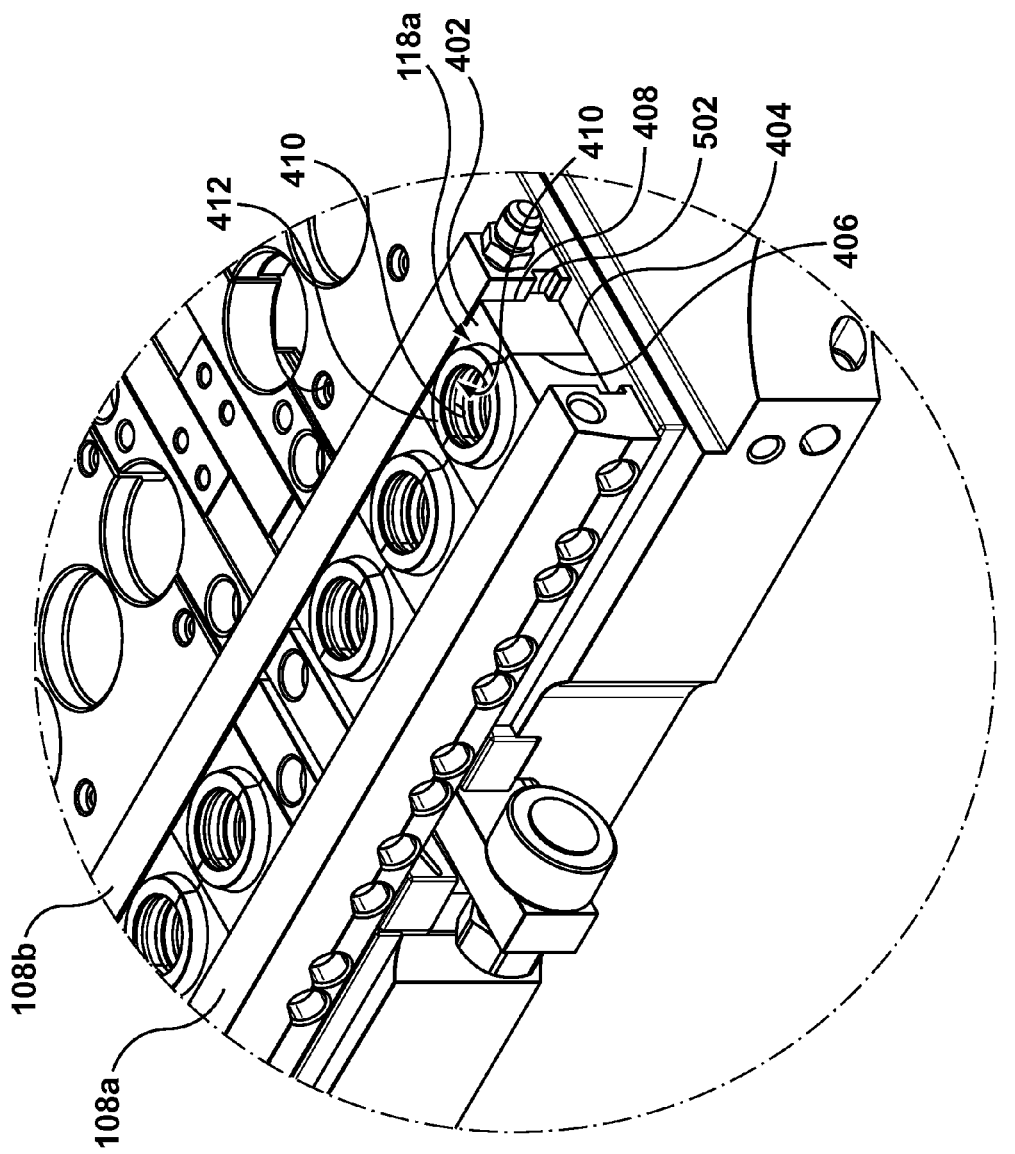
FIG. 4 is a perspective view of a portion of the stripper assembly 102 of FIG. 2.
Figure 5:
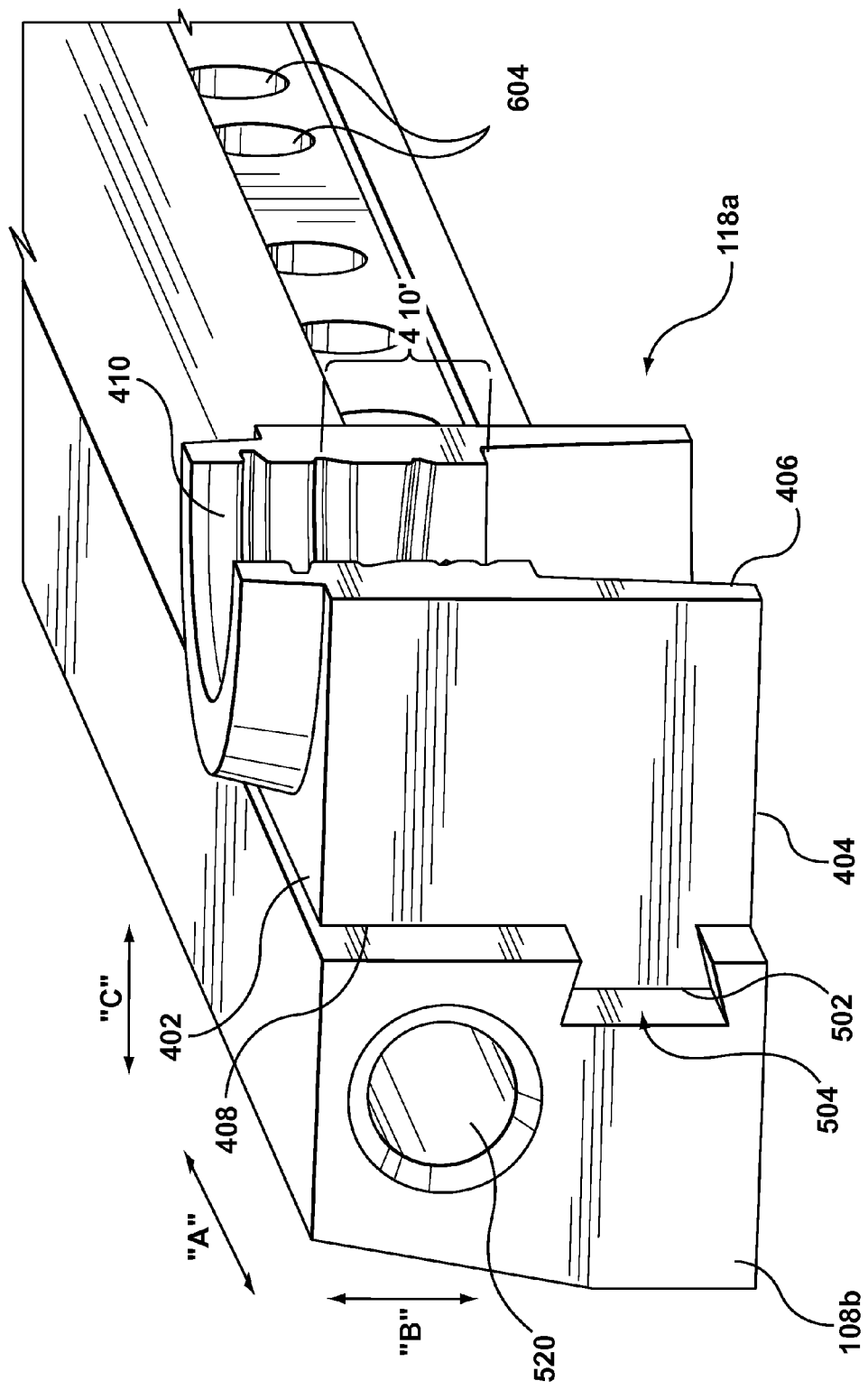
FIG. 5 is a perspective view of a slide bar and a split mold insert of FIG. 2, according to a first non-limiting embodiment of the present invention.

With continued reference to FIG. 4 and with reference to FIG. 5, the split mold insert 118a comprises a slide alignment member 502. As is best seen in FIG. 5, the second slide bar 108b comprises an insert alignment member 504. Within the specific non-limiting embodiment of FIG. 5, the shape of the slide alignment member 502 is complementary to the shape of the insert alignment member 504 in what is commonly referred to as a "key and keyway" arrangement. More specifically, the slide alignment member 502 comprises a generally trapezoidal male member, which extends outwardly from the back portion 408. The insert alignment member 504 comprises a generally trapezoidal female member, which extends inwardly into the second slide bar 108b and, more specifically, into the second slide portion 109c. It should be noted that the slide alignment member 502 can be slid within the insert alignment member 504 in a direction depicted in FIG. 5 at "A". It should be further noted that the arrangement of the slide alignment member 502 and the insert alignment member 504 substantially prevents movement of the split mold insert 118a in a direction depicted in FIG. 5 at "B", as well as in a direction depicted at "C".

Figure 6:
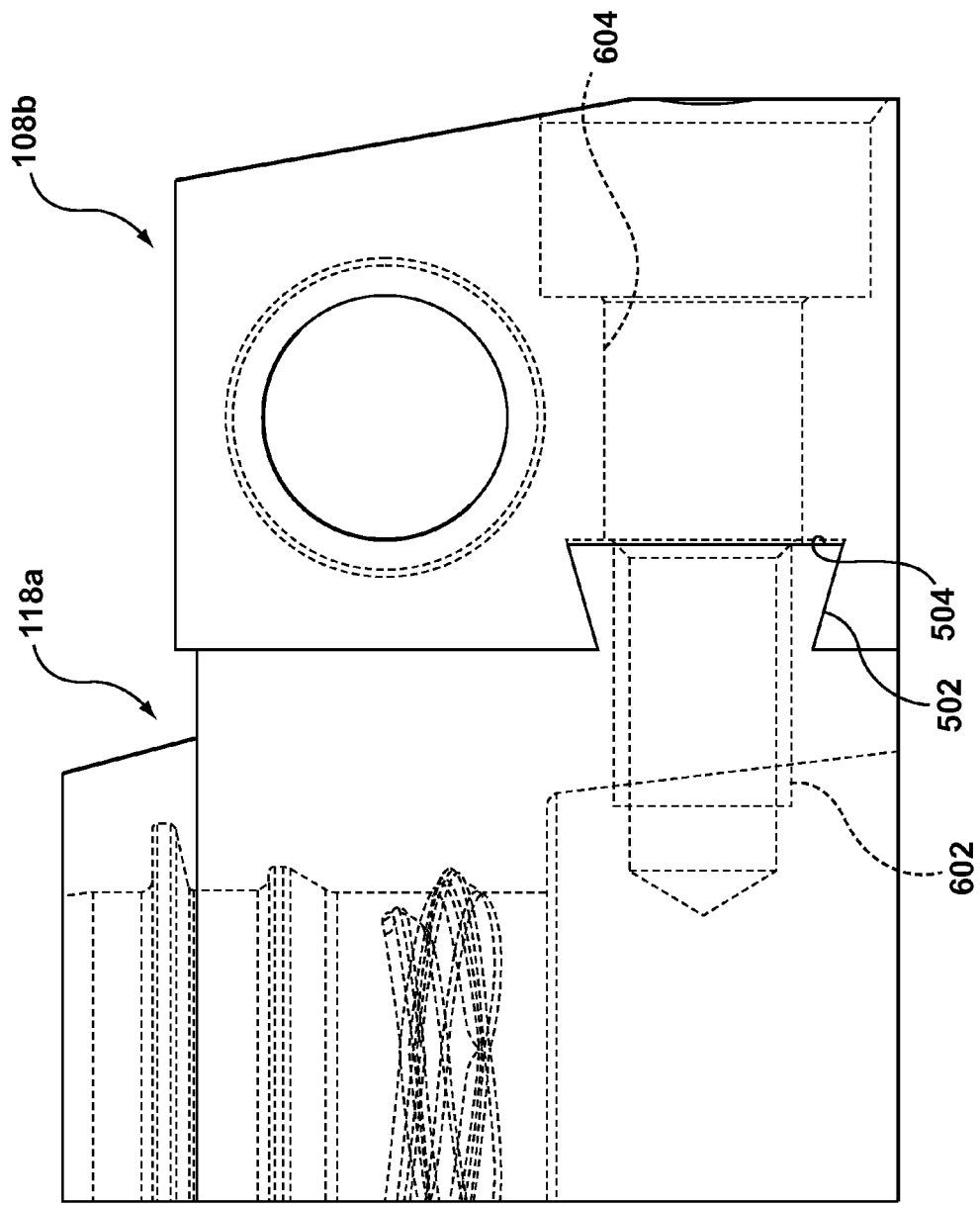
FIG. 6 is a side view of the slide bar and the split mold insert of FIG. 5, showing a slide alignment member and an insert alignment member (both in ghost lines) according to a first non-limiting embodiment of the present invention

With continued reference to FIG. 5 and with further reference to FIG. 6, the split mold insert 118a comprises a slide coupling member 602. As is best seen in FIG. 6, the second slide bar 108b comprises an insert coupling member 604. The insert coupling member 604 comprises at least one bore, each of the at least one bore for accepting a fastener (such as a bolt, etc), as is best seen in FIG. 2. Continuing with the description of FIG. 5 and FIG. 6, the slide coupling member 602 comprises at least one bore, each of the at least one bore for accepting the fastener (such as a bolt, etc.). In some embodiments of the present invention, which are particularly applicable where the fastener comprises a bolt, the at least one bore can be threaded, however other configurations are also possible. It will be noted that the slide coupling member 602 and the insert coupling member 604 are generally complementary to each other in the sense that a given pair of the slide coupling member 602 and the insert coupling member 604 are configured to receive the same fastener (for example, the same bolt, etc.). This does not, however, mean that the slide coupling member 602 and the insert coupling member 604 need to be of the same shape. Quite on the contrary, a diameter of the slide coupling member 602 and a diameter the insert coupling member 604 can, for example, differ as long as they can both accept the same fastener.

In use, when the slide coupling member 602 and the insert coupling member 604 are aligned therebetween and when a fastener (not depicted) is applied through the insert coupling member 604 and through the slide coupling member 602 to engage the slide coupling member 602, the arrangement of slide coupling member 602, the insert coupling member 604 and the fastener (not depicted) prevents the split mold insert 118a from moving in the direction depicted in FIG. 5 at "A" and at "C". Recalling that the slide alignment member 502 and the insert alignment member 504 substantially prevent movement of the split mold insert 118a in a direction depicted in FIG. 5 at "B", in use, the split mold insert 118a is prevented from substantially moving in the directions "A", "B" and "C".

An additional technical effect of this embodiment of the present invention may include ability to use a single instance of the slide coupling member 602 and the insert coupling member 604 (and a corresponding fastener), as the slide alignment member 502 and the insert alignment member 504 substantially prevent movement of the split mold insert 118a in a direction depicted in FIG. 5 at "B". However, it should be expressly understood that in alternative non-limiting embodiments of the present invention, two (or more) instances of the slide coupling member 602 and the insert coupling member 604 can be used as well.

The second slide bar 118b and the split mold insert 108a can be jointly thought of as a "split mold insert assembly".

Now, as is clearly seen in FIG. 5, the top portion 402 of the split mold insert 118a is substantially co-planar with a top portion of the second slide bar 108b and the bottom portion 404 is substantially co-planar with a bottom portion of the second slide bar 108b. A technical effect of this embodiment of the present invention may include that the split mold insert 118a does not substantially add to the stack height contributed to by the second slide bar 108b. In other words, when the arrangement of the split mold insert 118a and the second slide bar 108b as described herein is employed, the total stack height (similar to that depicted at H1 in FIG. 1) can be decreased. Those skilled in the art will appreciate, that one technical effect of this embodiment is a potentially shorter core assembly. Another technical effect of this embodiment is potential cost savings on the overall cost of the molding system, for example, due to less material required for the core assembly, tie bars and other components of the molding system (such, as for example, an injection molding system).

With continued reference to FIG. 5, the second slide bar 108b comprises a cooling channel 520. The cooling channel 520 extends substantially along a length of the second slide bar 108b and connects, in use, to a source of coolant (such as water, etc), which has been omitted for the sake of simplicity, but which is known to those of skill in the art. A coolant (such as water, etc.) flowing through the cooling channel 520, effectively, cools the second slide bar 108b. As is depicted in FIG. 5, a contact area between the second slide bar 108b and the split mold insert 118a substantially equals to an area of the back portion 408. Within such a non-limiting embodiment of the present invention, another technical effect may be achieved, whereby cooling of the split mold insert 118a can be achieved substantially through conductivity due to the increased contact area as compared to traditional split mold inserts (for example, the neck ring insert pair 52 depicted in FIG. 1).

Furthermore, as is also seen in FIG. 5, a portion of the molding surface defining portion 410 is located, in use (i.e. when assembled) substantially within an area defined between the top portion and the bottom portion of the second slide bar 108b. More specifically, a portion 410' of the molding surface defining portion 410 is located, in use, within an area defined between the top portion and the bottom portion of the second slide bar 108b. Within the specific non limiting embodiment of the present invention, the portion 410' can be said to comprise a substantial portion of the molding surface defining portion 410. However, in alternative non-limiting embodiment of the present invention, the portion 410' may comprise more or less of the total area of the molding surface defining portion 410.

As a result of this arrangement, the molding surface defining portion 410 is substantially proximate to the cooling channel 520. As such, another technical effect may be achieved, whereby cooling of the neck region 304 can be implemented in a more effective manner due to the arrangement of the split mold insert 118a to the second slide bar 108a by means of the back portion 408 of the split mold insert 118a.

Figure 7:
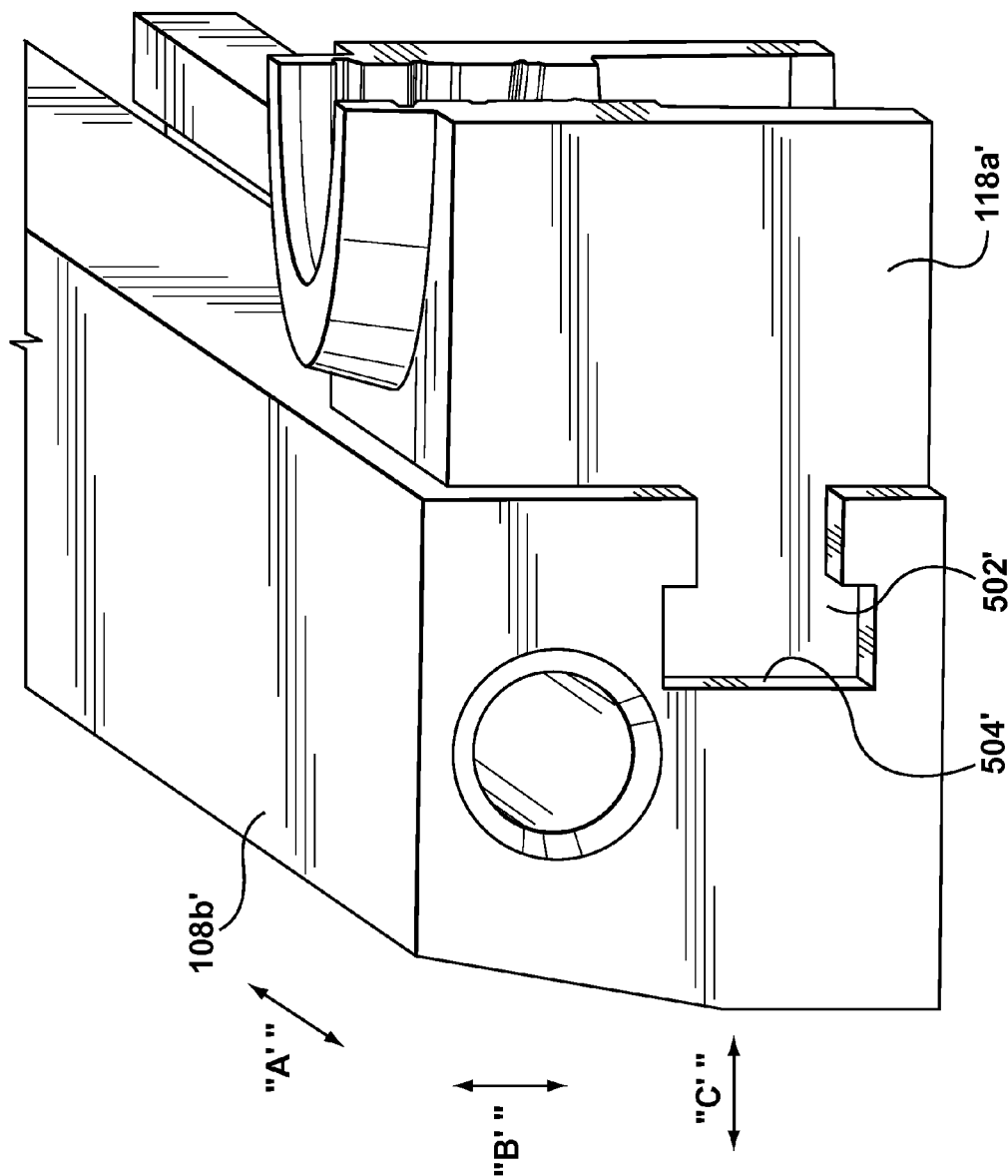
FIG. 7 is a perspective view of a slide bar and a split mold insert of FIG. 2, according to a second non-limiting embodiment of the present invention.
Figure 8:
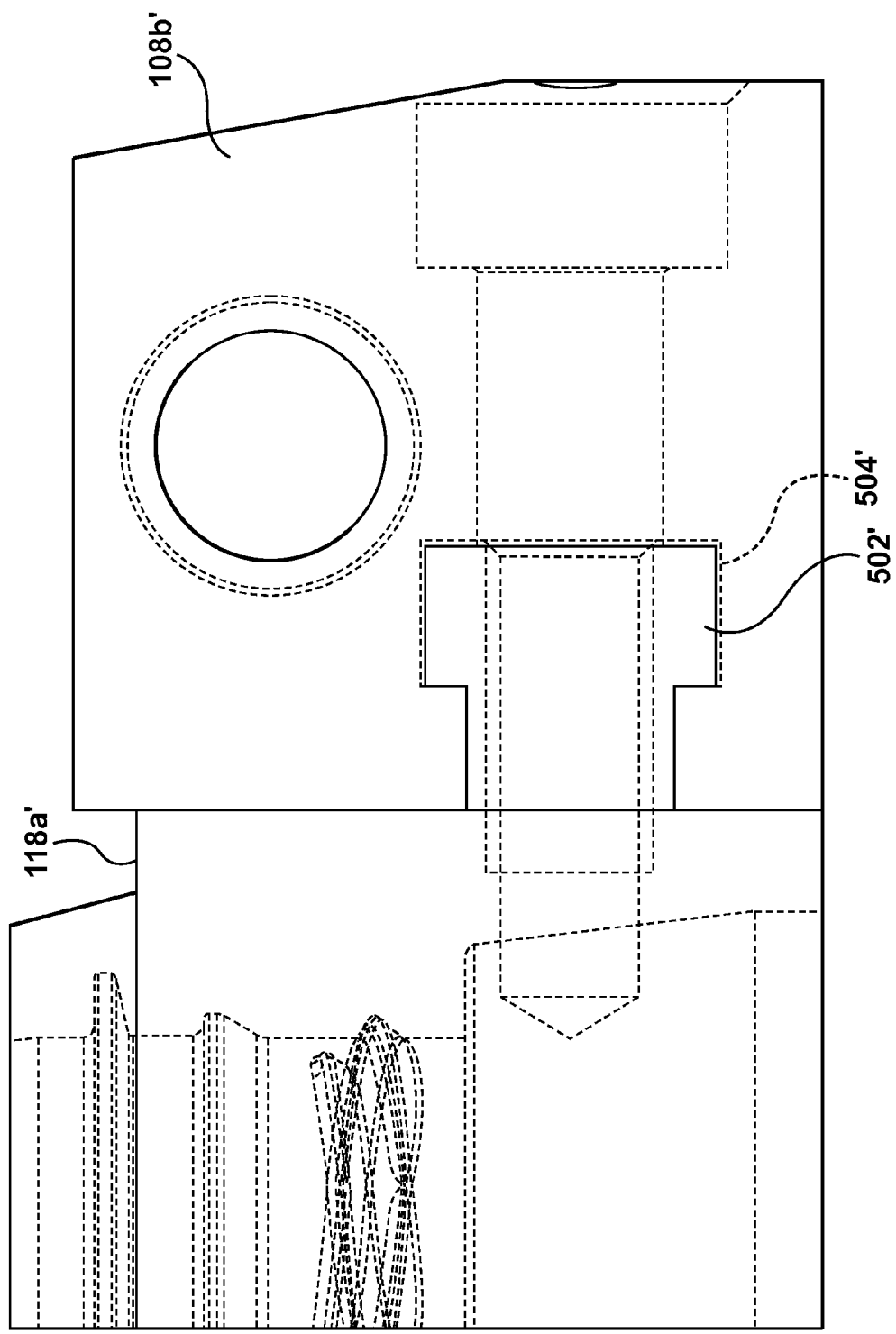
FIG. 8 is a side view of the slide bar and the split mold insert of FIG. 7, showing a slide alignment member and an insert alignment member (both in ghost lines) according to a second non-limiting embodiment of the present invention.

It should be expressly understood that the configuration of the split mold insert 118a and the second slide bar 108b may have a number of other alternatives. With reference to FIG. 7 and FIG. 8, another non-limiting embodiment of a split mold insert 118a' and a second slide bar 108b' is depicted. The split mold insert 118a' and the second slide bar 108b' can be substantially similar to the split mold insert 118a and the second slide bar 108b (but for the specific differences noted herein below) and, as such, like elements are depicted with like numerals. The split mold insert 118a' comprises a slide alignment member 502'. The second slide bar 108b' comprises an insert alignment member 504'. Within the specific non-limiting embodiment of FIG. 7, the shape of the slide alignment member 502' is complementary to the shape of the insert alignment member 504' in what is commonly referred to as a "key and keyway" arrangement. More specifically, the slide alignment member 502' comprises a generally "T-shape" male member, which extends outwardly from the back portion 408. The insert alignment member 504' comprises a generally "T-shaped" female member, which extends inwardly into the second slide bar 108b. It should be noted that the slide alignment member 502' can be slid within the insert alignment member 504' in a direction depicted in FIG. 7 at "A'". It should be further noted that the arrangement of the slide alignment member 502' and the insert alignment member 504' substantially prevents movement of the split mold insert 118a' in a direction depicted in FIG. 7 at "B'" and "C'".

Figure 9:
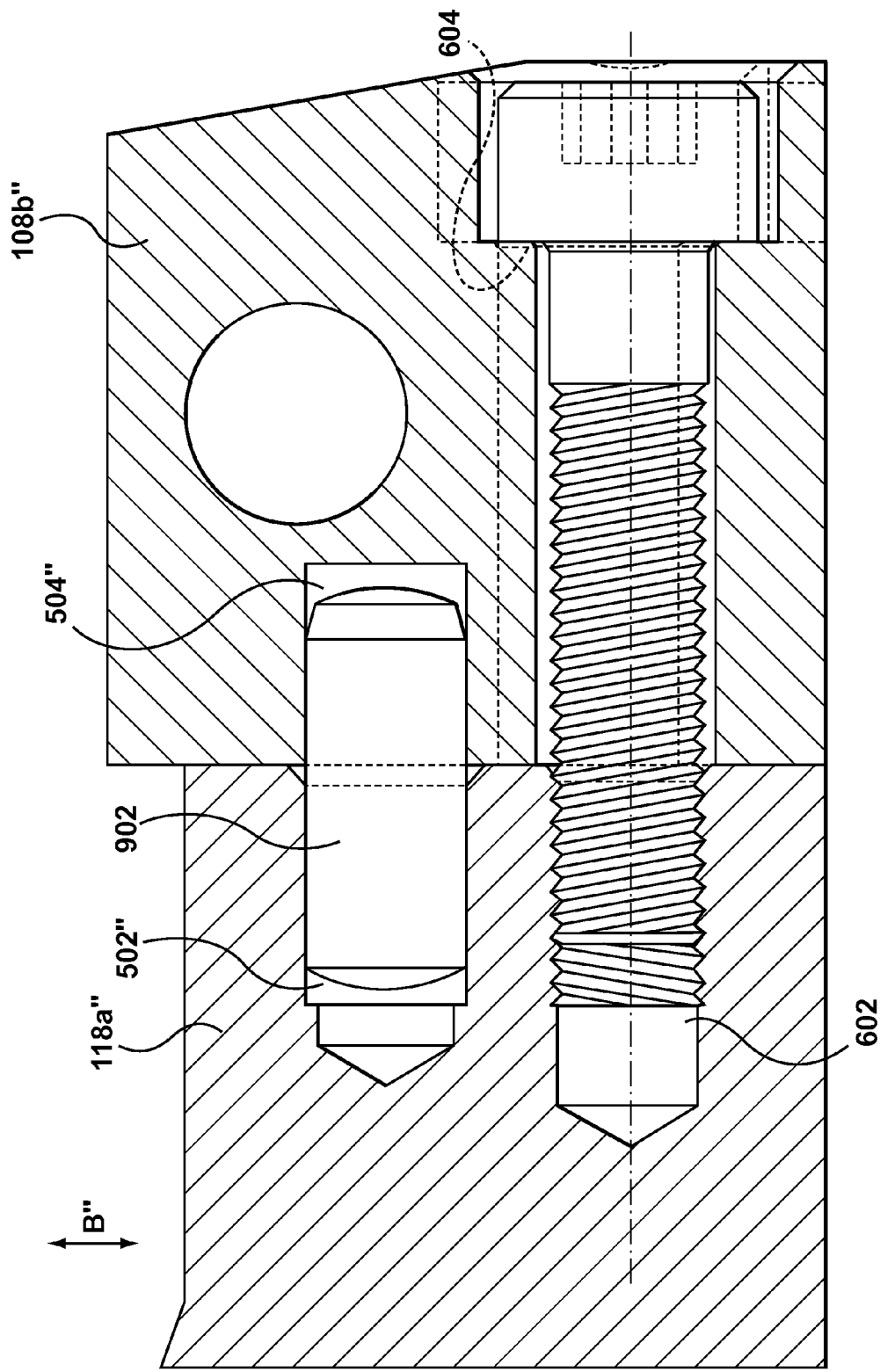
FIG. 9 is a cross section view of a slide bar and a split mold insert of FIG. 2, showing a slide alignment member and an insert alignment member according to a third non-limiting embodiment of the present invention

With reference to FIG. 9, another non-limiting embodiment of a split mold insert 118a" and a second slide bar 108b" is depicted. The split mold insert 118a" and the second slide bar 108b" can be substantially similar to the split mold insert 118a and the second slide bar 108b (but for the specific differences noted herein below) and, as such, like elements are depicted with like numerals. The split mold insert 118a" comprises a slide alignment member 502" and the second slide bar 108b" comprises an insert alignment member 504". Each of the slide alignment member 502" and the insert alignment member 504" comprises a respective receptacle, configured to receive a portion of a positioning member 902. Within the specific non-limiting embodiment of FIG. 9, the positioning member 902 comprises a dowel, and the slide alignment member 502" and the insert alignment member 504" comprises a respective bore configured to receive a portion of the dowel. In the specific non-limiting embodiment being described herein, the each of the slide alignment member 502" and the insert alignment member 504" comprises two instances of a respective receptacle, configured to receive a portion of the positioning member 902. In some embodiments of the present invention, the slide alignment member 502", the insert alignment member 504" and the positioning member 902 are configured in a tight tolerance arrangement.

In use, when the slide alignment member 502" and the insert alignment member 504" are in substantial alignment therebetween and when the positioning member 902 is installed, the arrangement of the slide alignment member 502", the insert alignment member 504" and the positioning member 902 substantially prevents any movement of the split mold insert 118a" in a direction depicted in FIG. 9 at "B''".

Figure 10:
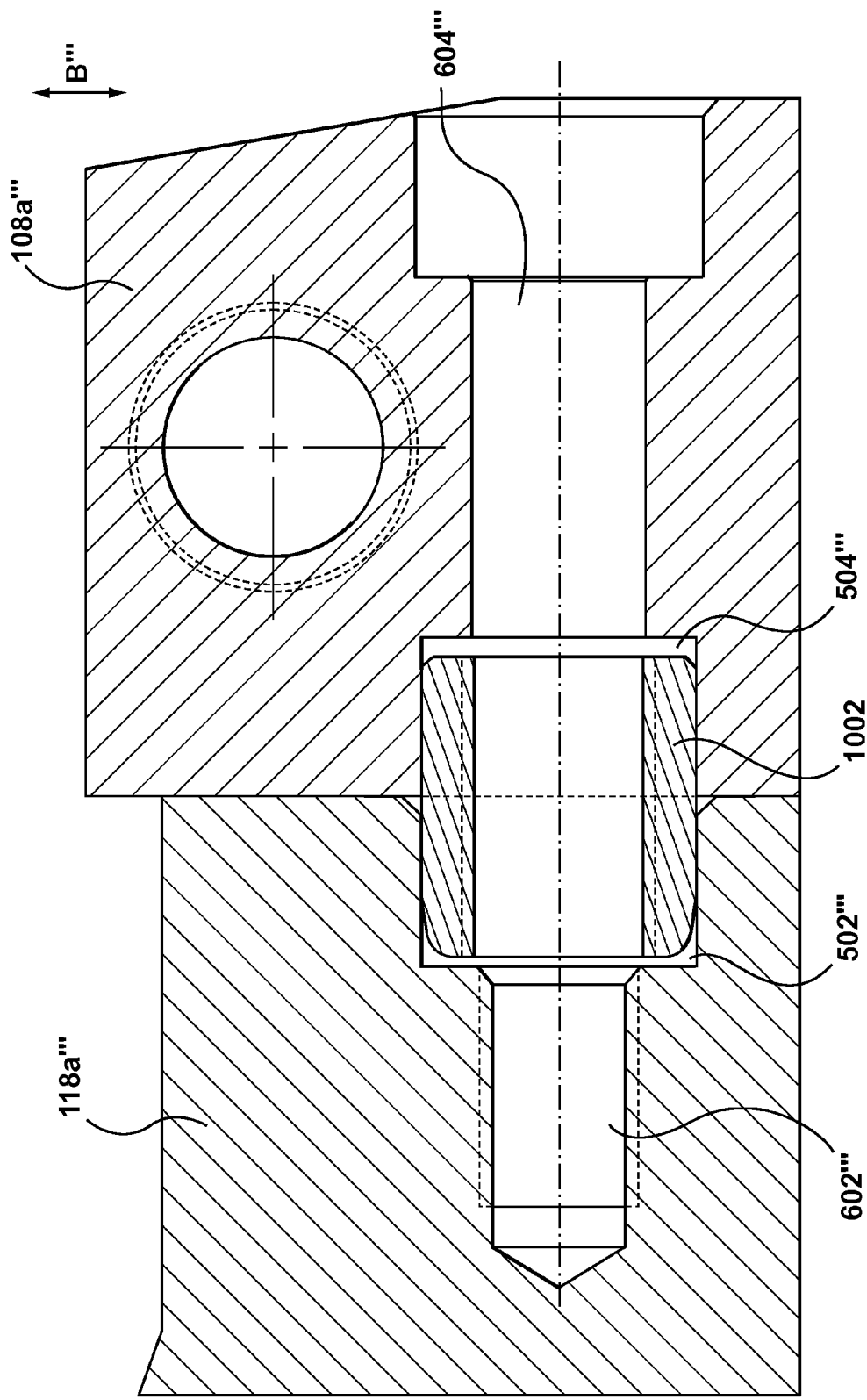
FIG. 10 is a cross section view of a slide bar and a split mold insert of FIG. 2, showing a slide alignment member and an insert alignment member according to a fourth non-limiting embodiment of the present invention

With reference to FIG. 10, another non-limiting embodiment of a split mold insert 118a''' and a second slide bar 108b''' is depicted. The split mold insert 118a''' and the second slide bar 108b''' can be substantially similar to the split mold insert 118a and the second slide bar 108b (but for the specific differences noted herein below) and, as such, like elements are depicted with like numerals. The split mold insert 118a''' comprises a slide alignment member 502''' and the second slide bar 108b''' comprises an insert alignment member 504'''. Each of the slide alignment member 502''' and the insert alignment member 504''' comprises a respective receptacle, configured to receive a portion of a positioning member 1002. Within the specific non-limiting embodiment of FIG. 10, the positioning member 1002 comprises a tubular dowel, and the slide alignment member 502''' and the insert alignment member 504''' comprises a respective bore configured to receive a portion of the tubular dowel. In use, when the slide alignment member 502''' and the insert alignment member 504''' are in substantial alignment therebetween and when the positioning member 1002 is installed, the arrangement of the slide alignment member 502''', the insert alignment member 504''' and the positioning member 1002 substantially prevents any movement of the split mold insert 118a''' in a direction depicted in FIG. 10 at "B''''".

It should be noted that similarly to the embodiment depicted with reference to FIG. 6, the split mold insert 118a''' of FIG. 10 comprises a slide coupling member 602'''. The second slide bar 108b comprises an insert coupling member 604'''. The insert coupling member 604''' comprises two bores each for accepting a fastener (such as a bolt, etc). The slide coupling member 602''' comprises at least one bore, each for accepting the fastener (such as a bolt, etc.). In some embodiments of the present invention, which are particularly applicable where the fastener comprises a bolt, the at least one bore can be threaded, however other configurations are also possible. It should be noted that only a single instance of the insert coupling member 604''' and the slide coupling member 602''' need to be associated with the slide alignment member 502''', the insert alignment member 504''' and the positioning member 1002 (i.e. the tubular dowel). However, in alternative embodiments of the present invention, both instances of the insert coupling member 604''' and the slide coupling member 602''' can be associated with the slide alignment member 502''', the insert alignment member 504''' and the positioning member 1002 (i.e. the tubular dowel).

In some of these embodiments of the present invention that use a dowel or a tubular dowel, an additional technical effect may include ability to remove a given split mold insert 118a", 118a''' without necessarily having to remove one or more other given split mold insert(s) 118a", 118a''' located next to the given split mold insert 118a", 118a'''.

How the stripper assembly 102 of FIG. 2 is assembled will now be described in more detail in the context of the split mold insert 118a and the second slide bar 108b of FIG. 5. Firstly, the split mold insert 118a is slid along the second slide bar 108b to a desired position. More specifically, by using the slide alignment member 502 and the insert alignment member 504, the split mold insert 118a is slid in the direction depicted in FIG. 5 at "A" to a desired position. As will be appreciated, the desired position can include an extreme position along the second slide bar 108b depicted in FIG. 2 at "E" or a position in a substantial abutment to another instance of the split mold insert 118a. Once the split mold insert 118a is positioned at the desired position, two fasteners (such as, for example, two bolts, etc.) are applied through the insert coupling member 604 and the slide coupling member 602. Effectively, the split mold insert 118a can be said to have been secured to the second slide bar 108b by means of a connecting interface disposed at the back portion 408 of the split mold insert 108a. In the context of the description presented herein, the connecting interface comprises the above-described slide alignment member 502 and the slide coupling member 602, as well as other embodiments thereof depicted with reference to FIGS. 7-10, as well as other variants as will be appreciated by those of skill in the art.

The process is repeated for every instance of the split mold insert 118a. Those of ordinary skilled in the art will appreciate how the assembly process can be modified in the context of embodiments depicted in FIG. 7, FIG. 9 and FIG. 10. Once the plurality of first split mold inserts 116 and the plurality of second split mold inserts 118 have been so assembled to a respective the first slide bar 108a and the second slide bar 108b; the first slide bar 108a and the second slide bar 108b are coupled to a respective one of the plurality of first actuating bars 110 and the plurality of second actuating bars 112. This process is repeated for each instance of the first slide bar 108a and the second slide bar 108b.

Figure 11:
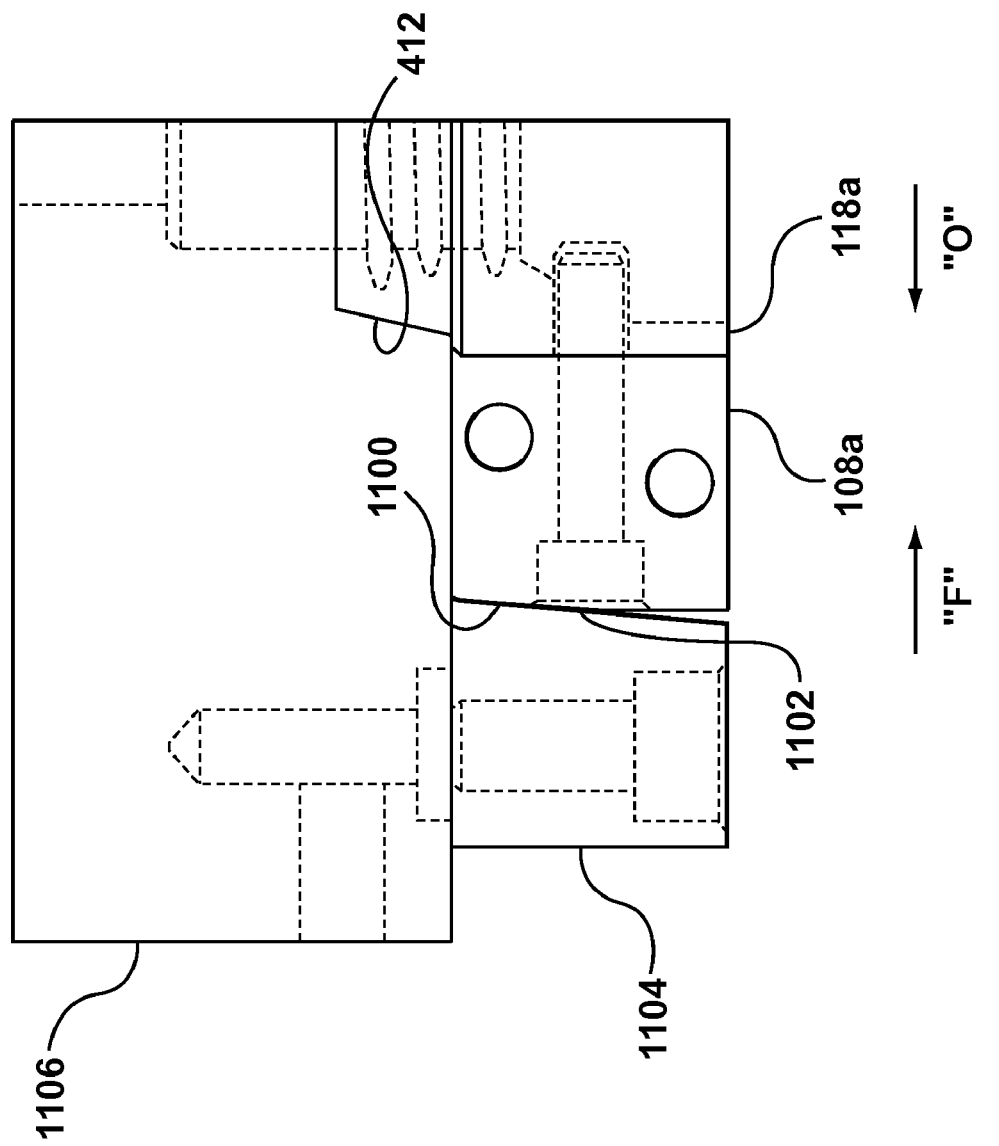
FIG. 11 is a schematic side view of the slide bar, a split mold insert and a taper lock of FIG. 1 and partial view of a cavity plate assembly of a molding system, according to a non-limiting embodiment of the present invention.

With reference to FIG. 11, the first slide bar 108a may comprise a first slide tapered portion 1100, which is disposed along at least a portion the third slide portion 109d. In use, the first slide tapered portion 1100 cooperates with a first mold tapered portion 1102 of a first taper lock 1004 disposed, for example, on a cavity plate assembly 1106. Similarly, the second slide bar 108b may comprise a second slide tapered portion (not depicted), which cooperates, in use, with a second mold tapered portion (not depicted) of a second taper lock (not depicted) disposed, for example, on the cavity plate assembly 1106. The second slide tapered portion may be substantially similar to the first slide tapered portion 1100 and the second taper lock may be substantially similar to the first taper lock 1104. In use, during an appropriate portion of a molding cycle (i.e. in a mold closed position), the first taper lock 1104 cooperates with the first taper lock 1104 and, effectively, applies force in a direction depicted in FIG. 11 at "F" to substantially prevent any movement of the first slide bar 108a in a direction depicted in FIG. 11 at "O".

Figure 1:
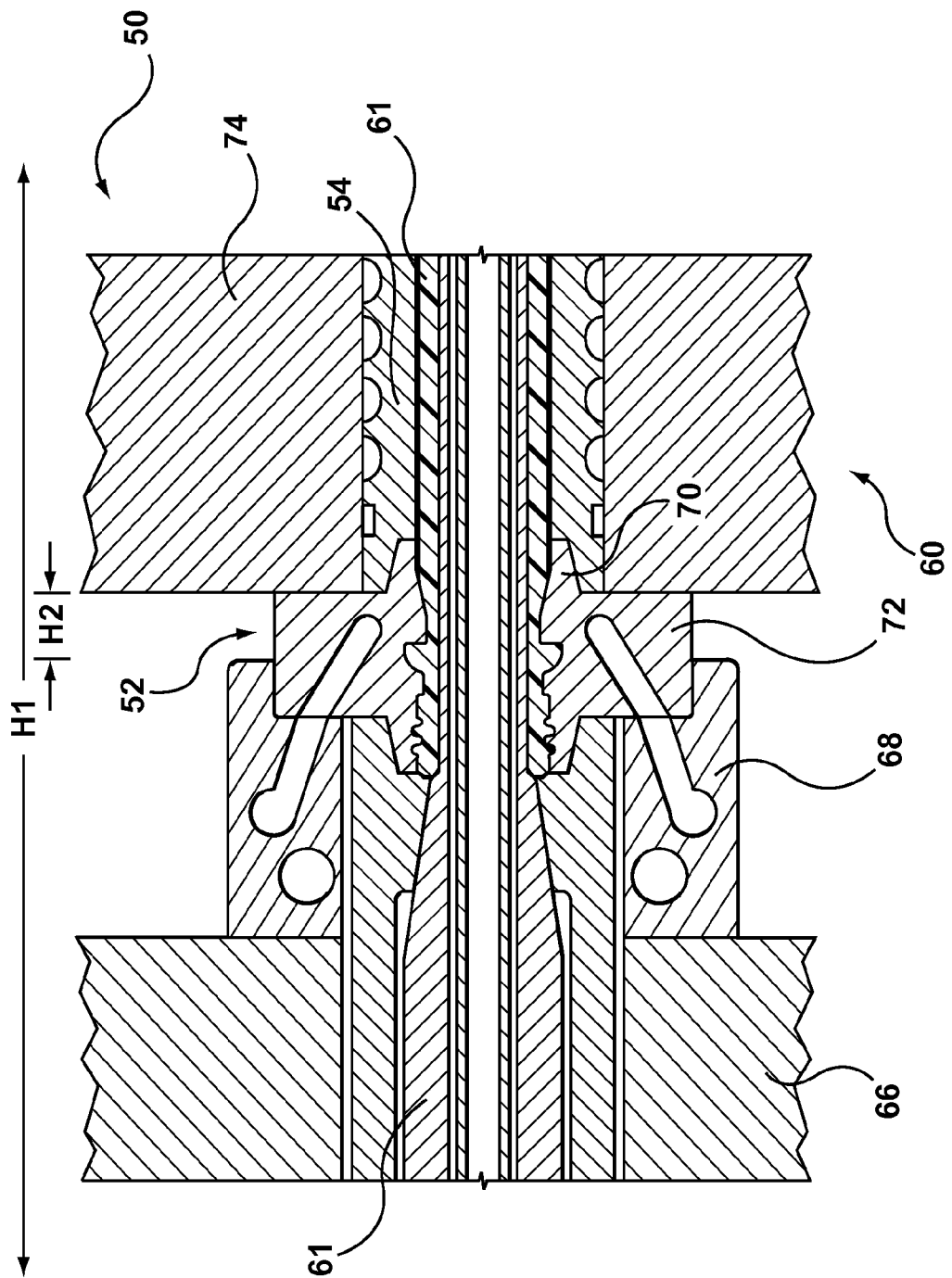
FIG. 1 is a schematic view along a portion of an injection mold 50 with a neck ring insert pair 52 according to a prior art solution.

Recalling that the split mold insert 118a comprises a taper portion 412, another technical effect of this embodiment of the present invention may be achieved whereby the taper portion 412 performs exclusively an alignment function and does not perform a locking function. The locking function, traditionally performed by the top projecting portion of the neck ring of FIG. 1, is effectively shifted to the first slide tapered portion 1100 and the first mold tapered portion 1102. As a result of this arrangement, a technical effect of this embodiment may include not pre-loading the taper portion 412. Another technical effect of this embodiment may include reduced wear of the taper portion 412 and, as a result, better longevity associated with the split mold insert 118a.

It should be noted that even though the slide alignment member 502 of FIG. 5 has been depicted as a male member and the insert alignment member 504 of FIG. 5 has been depicted as a female member, this need not be so in every embodiment of the present invention. Accordingly, in an alternative non-limiting embodiment of the present invention, the slide alignment member 502 can comprise a female member and the insert alignment member 504 can comprise a male member. Naturally, similar considerations apply to the slide alignment member 502' and the insert alignment member 504' of FIG. 7.

The description of the embodiments of the present inventions provides examples of the present invention, and these examples do not limit the scope of the present invention. It is to be expressly understood that the scope of the present invention is limited by the claims only. The concepts described above may be adapted for specific conditions and/or functions, and may be further extended to a variety of other applications that are within the scope of the present invention. Having thus described the embodiments of the present invention, it will be apparent that modifications and enhancements are possible without departing from the concepts as described. Therefore, what is to be protected by way of letters patent are limited only by the scope of the following claims:

The invention claimed is:

1. A first split mold insert complementary to a second split mold insert, the first and second split mold inserts configured, in use, to form a neck region of a preform capable of being blow-molded, the first split mold insert comprising:

a top portion and a bottom portion; said top portion for abutting, in use, a cavity plate assembly and said bottom portion being at an opposite extreme relative to said top portion;

a back portion and a face portion opposite each other, extending between said top and bottom portions, said face portion defining a molding surface defining portion for forming, in use, at least a portion of the neck region of the preform, the back portion including a back wall located on an opposite extreme of the first split mold insert relative to the face portion;

the back portion comprising a connecting interface for connecting, in use, to a slide bar, wherein said connecting interface comprises an alignment interface for positioning the first split mold insert, in use, relative to the slide bar and a coupling interface defined at least partially through the back wall for securing the first split mold insert, in use, to the slide bar.

2. The first split mold insert of claim 1, wherein said coupling interface comprises at least one bore for accepting, in use, a fastener.

3. The first split mold insert of claim 1, wherein said alignment interface comprises a male alignment member configured to cooperate, in use, with a female alignment member associated with the slide bar.

4. The first split mold insert of claim 3, wherein said male alignment member is generally trapezoidal in shape.

5. The first split mold insert of claim 3, wherein said male alignment member is generally "T-shaped".

6. The first split mold insert of claim 1, wherein said alignment interface comprises a female alignment member configured to cooperate, in use, with a male alignment member associated with the slide bar.

7. The first split mold insert of claim 1, wherein said alignment interface comprises a first receptacle complementary to a second receptacle associated with the slide bar, wherein the first receptacle is configured to accept, in use, a first portion of a positioning member and the second receptacle is configured, in use, to accept a second portion of the positioning member.

8. The first split mold insert of claim 7, wherein said positioning member comprises a dowel.

9. The first split insert of claim 8, wherein said first receptacle, said second receptacle and said dowel are configured in a tight tolerance arrangement.

10. The first split mold insert of claim 7, wherein said positioning member comprises a tubular dowel.

11. The first split mold insert of claim 10, wherein said first receptacle, said second receptacle and said tubular dowel are configured in a tight tolerance arrangement.

12. The first split mold insert of claim 1, further comprising a contact area defined by said back portion and by a face slide portion of the slide bar, and wherein the contact area is substantially contained between a top extreme and a bottom extreme of the slide bar.

13. The first split mold insert of claim 1, the slide bar further comprising a cooling channel, wherein at least a portion of said molding surface defining portion is located, in use, proximate to the cooling channel.

14. A split mold assembly for use with an injection molding system for producing a preform capable of being blow-molded into a container, the split mold assembly comprising:
  a slide bar for attachment, in use, to an actuating bar of the injection molding system, the slide bar defining a face slide portion;
  a split mold insert comprising:
    a top portion and a bottom portion; said top portion for abutting, in use, a cavity plate assembly and the bottom portion being at an opposite extreme relative to said top portion;
    a back portion and a face portion opposite each other, extending between said top and bottom portions, said face portion defining a molding surface defining portion for forming, in use, at least a portion of the neck portion of the preform, the back portion including a back wall located on an opposite extreme of the first split mold insert relative to the face portion;
    said back portion comprising a connecting interface for connecting, in use, to the face slide portion of the slide bar,
    wherein said connecting interface comprises an alignment interface for positioning the split mold insert relative to the slide bar and a coupling interface defined at least partially through the back wall for securing the split mold insert, in use, to the slide bar.

15. The split mold assembly of claim 14, wherein said coupling interface comprises at least one bore for accepting, in use, a fastener.

16. The split mold assembly of claim 14, wherein said alignment interface comprises a male alignment member configured to cooperate, in use, with a female alignment member associated with the face slide portion of the slide bar.

17. The split mold assembly of claim 16, wherein said male alignment member and said female alignment member are generally trapezoidal in shape.

18. The split mold assembly of claim 16, wherein said male alignment member and said female alignment member are generally "T-shaped".

19. The split mold assembly of claim 14, wherein said alignment interface comprises a female alignment member configured to cooperate, in use, with a male alignment member associated with the slide bar.

20. The split mold assembly of claim 14, wherein said alignment interface comprises a first receptacle complementary to a second receptacle associated with the face slide portion of the slide bar, wherein said first receptacle is configured to accept, in use, a first portion of a positioning member and said second receptacle is configured, in use, to accept a second portion of the positioning member.

21. The split mold assembly of claim 20, wherein said positioning member comprises a dowel.

22. The split mold assembly of claim 21, wherein said first receptacle, said second receptacle and said dowel are configured in a tight tolerance arrangement.

23. The split mold assembly of claim 20, wherein said positioning member comprises a tubular dowel.

24. The split mold assembly of claim 23, wherein said first receptacle, said second receptacle and said tubular dowel are configured in a tight tolerance arrangement.

25. The split mold assembly of claim 14, further comprising a contact area defined by the back portion of said split mold insert and by said face slide portion of said slide bar, and wherein the contact area is substantially contained between a top extreme and a bottom extreme of said slide bar.

26. The split mold assembly of claim 14, said slide bar further comprising a cooling channel, wherein at least a portion of said molding surface defining portion is located, in use, proximate to the cooling channel.

27. An injection molding system incorporating the split mold assembly of claim 14.

28. A connecting interface positioned between (i) a back portion of a split mold insert, the back portion being at an opposite extreme relative to a face portion of the split mold insert, the face portion defining a molding surface defining portion for forming, at least in part, a neck region of a preform capable of being blow-molded into a container and (ii) a face slide portion of a slide bar; the back portion including a back wall located at the opposite extreme, the connecting interface comprising:
  an alignment interface for positioning the split mold insert relative to the slide bar; and
  a coupling interface for securing the split mold insert, in use, to the slide bar, the coupling interface defined at least in part through the back wall.

29. The connecting interface claim 28, wherein said coupling interface comprises at least one bore associated with the split mold insert and at least one bore associated with the slide bar, complementary to each other, for accepting, in use, a fastener.

30. The connecting interface of claim 28, wherein said alignment interface comprises a female alignment member associated with the slide bar and a male alignment member associated with the split mold insert, configured, in use, to cooperate with each other.

31. The connecting interface of claim 30, wherein said male alignment member and said female member are generally trapezoidal in shape.

32. The connecting interface of claim 30, wherein said male alignment member and said female alignment member are generally "T-shaped".

33. The connecting interface of claim 29, wherein said alignment interface comprises a male alignment member associated with the slide bar and a female alignment member associated with the split mold insert, configured, in use, to cooperate with each other.

34. The connecting interface of claim 33, wherein said male alignment member and said female member are generally trapezoidal in shape.

35. The connecting interface of claim 33, wherein said male alignment member and said female alignment member are generally "T-shaped".

36. The connecting interface of claim 29, wherein said alignment interface comprises (i) a first receptacle associated with said split mold insert and (ii) a second receptacle associated with the slide bar, said first receptacle is configured to accept, in use, a first portion of a positioning member and said second receptacle is configured, in use, to accept a second portion of the positioning member.

37. The connecting interface of claim 36, wherein said positioning member comprises a dowel.

38. The connecting interface of claim 37, wherein said first receptacle, said second receptacle and said dowel are configured in a tight tolerance arrangement.

39. The connecting member of claim 36, wherein said positioning member comprises a tubular dowel.

40. The connecting member of claim 39, wherein said first receptacle, said second receptacle and said tubular dowel are configured in a tight tolerance arrangement.

41. A split mold assembly for use with an injection molding system for producing a preform capable of being blow-molded into a container, the split mold assembly comprising:
  a slide bar for attachment, in use, to an actuating bar of the injection molding system;

a split mold insert comprising:
- a connecting interface disposed on a back portion thereof for connection, in use, to said slide bar, the back portion including a back wall located on an opposite extreme of the first split mold insert relative to the face portion,
- wherein said connecting interface comprises an alignment interface for positioning the split mold insert, in use, relative to the slide bar and a coupling interface defined at least partially through the back wall for securing the split mold insert, in use, to the slide bar.

42. The split mold assembly of claim 41, wherein said coupling interface comprises at least one bore for accepting, in use, a fastener.

43. The split mold assembly of claim 41, wherein said alignment interface comprises a male alignment member configured to cooperate, in use, with a female alignment member associated with the slide bar.

44. The split mold assembly of claim 43, wherein said male alignment member is generally trapezoidal in shape.

45. The split mold assembly of claim 43, wherein said male alignment member is generally "T-shaped".

46. The split mold assembly of claim 41, wherein said alignment interface comprises a female alignment member configured to cooperate, in use, with a male alignment member associated with the slide bar.

47. The split mold assembly of claim 41, wherein said alignment interface comprises a first receptacle complementary to a second receptacle associated with the slide bar, wherein the first receptacle is configured to accept, in use, a first portion of a positioning member and the second receptacle is configured, in use, to accept a second portion of the positioning member.

48. The split mold assembly of claim 47, wherein said positioning member comprises a dowel.

49. The split mold assembly of claim 48, wherein said first receptacle, said second receptacle and said dowel are configured in a tight tolerance arrangement.

50. The split mold assembly of claim 47, wherein said positioning member comprises a tubular dowel.

51. The split mold assembly of claim 50, wherein said first receptacle, said second receptacle and said tubular dowel are configured in a tight tolerance arrangement.

52. The split mold assembly of claim 41, further comprising a contact area substantially defined by said back portion and by a face slide portion of the slide bar, and wherein the contact area is substantially contained between a top extreme and a bottom extreme of the slide bar.

53. The split mold assembly of claim 41, the slide bar further comprising a cooling channel, wherein at least a portion of said molding surface defining portion is located, in use, proximate to the cooling channel.

* * * * *